United States Patent [19]
Verlinde

[11] 3,872,674
[45] Mar. 25, 1975

[54] DEVICE FOR REGULATING THE OPERATION OF TWO HYDRAULIC MOTORS MOUNTED IN SERIES

[75] Inventor: Auguste P. Verlinde, Fournes en Weppes, France

[73] Assignee: Verlinde S.A., Loos, France

[22] Filed: Apr. 12, 1973

[21] Appl. No.: 350,582

[30] Foreign Application Priority Data

Apr. 20, 1972 France..........................72.14936

[52] U.S. Cl........................ 60/706, 60/720, 91/171
[51] Int. Cl............................................ F15b 11/22
[58] Field of Search ............ 91/411, 412, 171, 189; 60/706, 720

[56] References Cited
UNITED STATES PATENTS
2,112,466 3/1938 Maloon................................ 91/189
3,435,616 4/1969 Waldorff............................ 60/97 E Primary Examiner—Martin P. Schwadron
Assistant Examiner—Allen M. Ostrager
Attorney, Agent, or Firm—Cameron, Kerkam, Sutton, Stowell & Stowell

[57] ABSTRACT

A device for regulating the operation of two hydraulic motors mounted in series has a command circuit for the motors connected above and below the motor that is fed first and connected to the ends of a derivation conduit in which the flow is controlled by an adjustable throttle activated by a feeler which, according to the advance or delay of the first motor, feeds the second motor with a respectively greater or lesser quantity of fluid. The device may regulate the operation of the motors of an articulated travelling crane.

7 Claims, 8 Drawing Figures

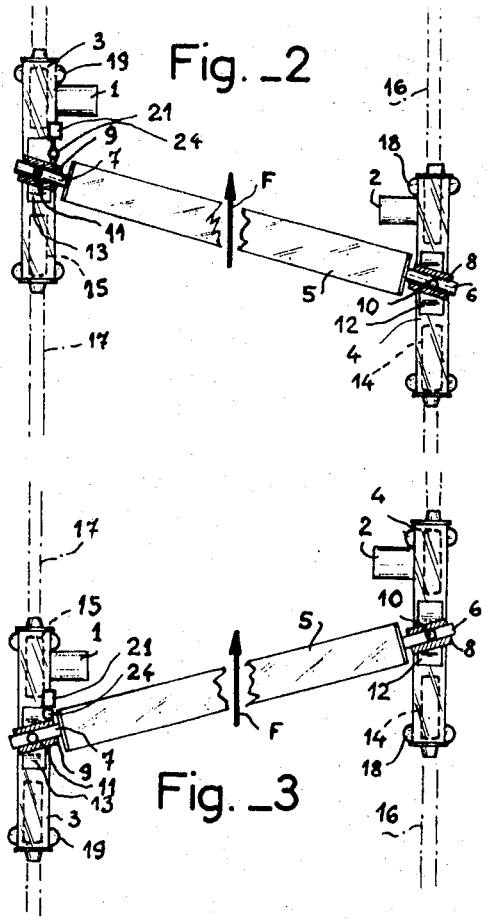
Fig._2
Fig._3
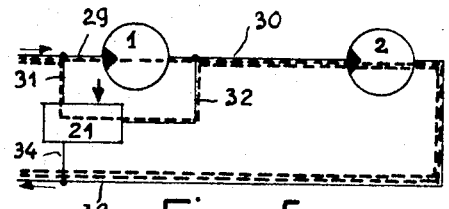
Fig._5
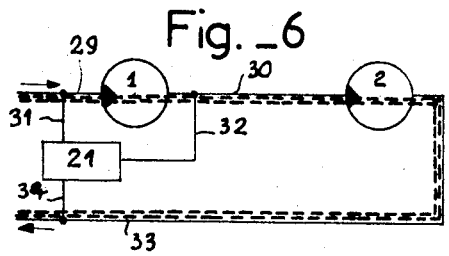
Fig._6
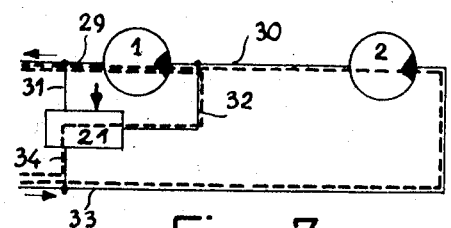
Fig._7
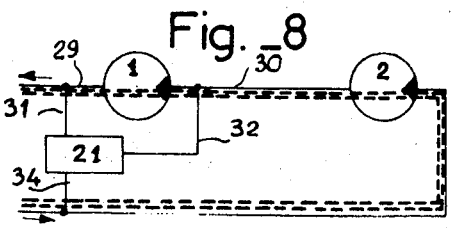
Fig._8
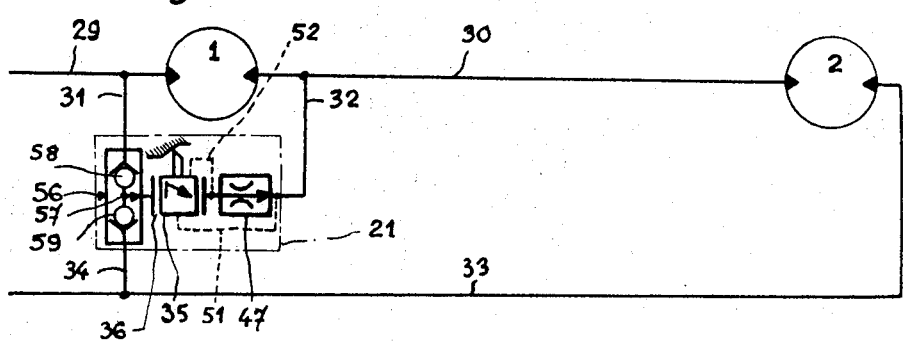
Fig._4

DEVICE FOR REGULATING THE OPERATION OF TWO HYDRAULIC MOTORS MOUNTED IN SERIES

BACKGROUND OF THE INVENTION

The invention relates to a device for regulating the operation of two hydraulic motors mounted in series.

Such a device is to be applied more specifically, but not exclusively, for regulating the operation of mechanically independent motors of a movable machine guided, for instance, by rails, as is the case with the motors installed on both ends of either a travelling crane that is set or suspended or of a gantry crane.

The more rapid advance of one of the motors has the tendency to incline the machine with respect to a normal direction of displacement.

This phenomenon, commonly called "crabwise" movement creates great lateral forces on the rails that guide the displacement and on the support or suspension travellers of the machine, until abruptly the traveller that was behind is elastically projected forward.

In order to correct such an inconvenience of the crane runways, so called "rigid" runways, it is known not to regulate the advance of the motors and thus to prevent the crabwise movement but to remove the lateral efforts that it causes by tolerating, on one hand, a slight articulation on a horizontal plane between the beam (or beams) and the travellers that constitute the machine and, on the other hand, a slight sliding motion of the beam in its housing on said travellers. Sometimes, such machines, generally called "articulated rolling beams," allow for an oscillation of their beam around a horizontal axis. In order to prevent the possibility that the articulation be completely absorbed from the very beginning, which would put the articulated rolling beam back into the same condition as the rigid runway mentioned above, it is necessary to maintain the beam appreciably in a median position within its limits of articulation.

Therefore, either for rigid runways or articulated rolling beams it is important to achieve the regulation of the operation of the motors of each traveller.

The object of the present invention is a device that achieves this regulation when the motors are hydraulic and mounted in series on the same circuit. When both motors mounted in series have the same cylinder capacity, the one that is fed first by the circuit will necessarily have the tendency to turn faster than the second which is fed by a flow of lesser pressure which pressure corresponds to the pressure of the flow that feeds the first motor less variable losses due to the internal losses at the first motor.

One of the objects of the present invention is to achieve the desired regulation through a direct action on the control circuit of the motors.

Furthermore the present invention is primarily for a machine that moves alternately in one direction and in the opposite direction, whereby the motors must rotate in two directions. Another object of the present invention is to provide a device that acts whatever the direction of circulation of the fluid, and regardless of which of the two motors is fed first.

SUMMARY OF THE INVENTION

The present invention is a device on the control circuit of the motors, above and below the motor that is fed first, connected to the ends of a derivation conduit, the output of which is controlled by an adjustable throttle that is activated by a feeler which, according to the advance or delay of the first motor, feeds the second motor by a greater or lesser flow than that going through the first motor to allow the first motor to take the lead or to catch up.

BRIEF DESCRIPTION OF THE DRAWINGS

The present invention will be hereafter described with reference to a preferred embodiment shown in the accompanying drawings in which:

FIGS. 2 and 3 show an articulated rolling beam and feelers at two extreme positions that are strongly exagerated;

FIG. 4 is a hydraulic control diagram for two motors; and

FIGS. 5 to 8 are diagrams illustrating the operation of the invention in opposite directions of circulation.

DESCRIPTION OF THE PREFERRED EMBODIMENT

Figure 1:
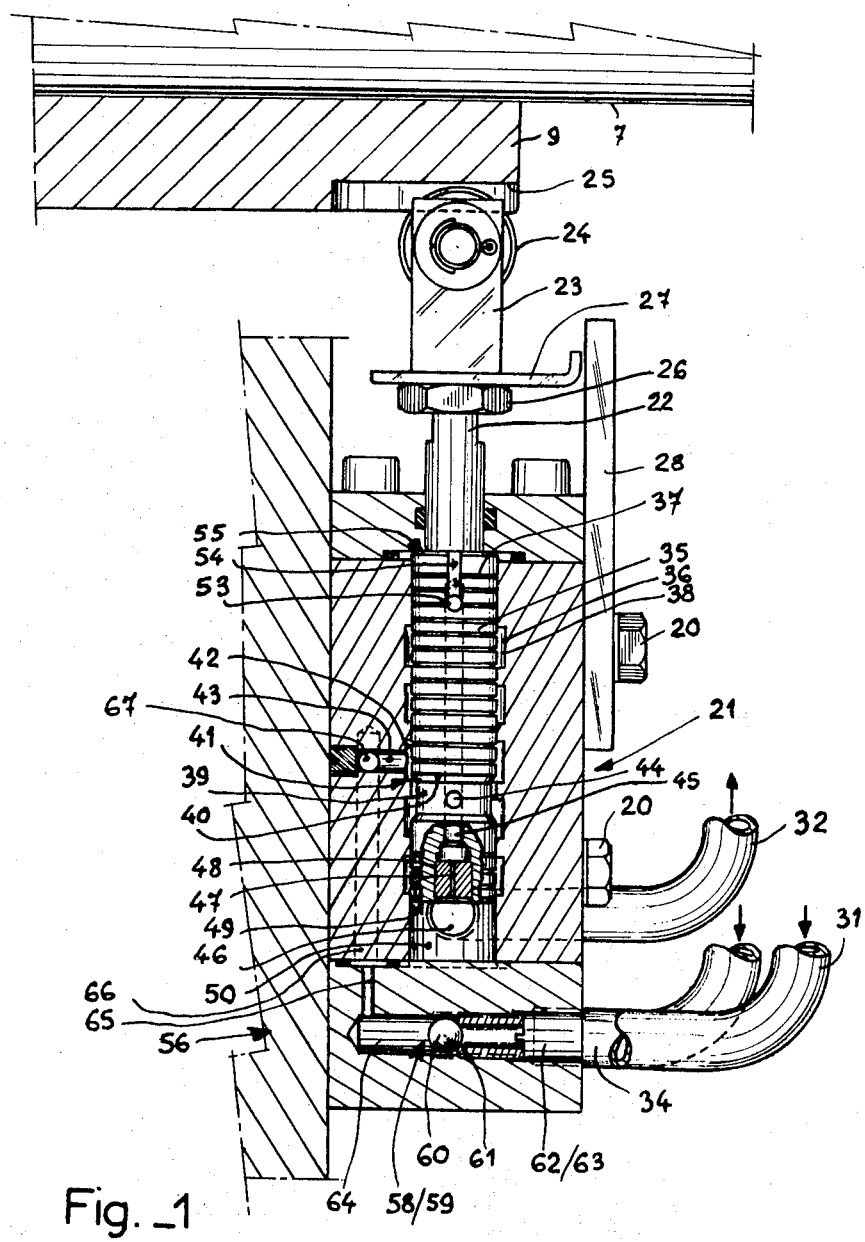
FIG. 1 is a sectional view of the feeler.

As explained above, the object of the invention is to regulate the operation of two hydraulic motors 1 and 2, which in the present embodiment, each drives one of the travellers 3 and 4 for a beam 5 whose ends are journalled at 6 and 7 to the travellers on horizontal axles and in the prolongation of each other. These journals 6 and 7 are engaged in bearings 8 and 9 in which they may slide axially.

Bearings 8 and 9 have pins 10 and 11, respectively, with a vertical axis, that is adjusted in a housing made in cradles 12 and 13 rigidly locked to the corresponding traveller 3 or 4. Pins 10 and 11 allow beam 5, with respect to travellers 3 and 4, a slight articulation in a horizontal plane, whereby the variation of the distance between the two pins 10 and 11 is absorbed by the axial sliding of the journals 6 and 7 in their bearings 8 and 9.

Travellers 3 and 4 are supported by rollers 14 and 15 on rails 16 and 17. There are additional lateral rollers 18 and 19 that guide the travellers 3 and 4 on said rails.

If the beam shown in FIGS. 2 and 3 advances in the direction of the arrow F and if motor 1 is fed first, motor 1 will have the lead as in FIG. 2 and it will be behind as in FIG. 3.

In order to determine the inclination of beam 5 with respect to the travellers 3 and 4, there is mounted on traveller 3 by screw 20 the body of a feeler 21 comprising (FIG. 1) a shaft 22 carrying on its end a fork-joint 23 that receives a roller 24 which is constantly urged toward beam 5 or a rigid extension thereof in an articulation movement. In this embodiment roller 24 rests on a flat part 25 that is provided on the side of bearing 9.

Fork-joint 23 may be mounted at the end of shaft 22 on screw thread and can be locked in required position by lock nut 26.

Advantageously, shaft carriers a plaquette 27 one of which, with a small clearance moves along one of the faces of a guide 28 that is carried by the body of feeler 21, so that shaft 22 can not rotate and roller 24 remains correctly oriented.

With reference to FIGS. 4 to 8, it can be seen that in order to regulate the operation of the motors 1 and 2, the conduit 29, which in the case of FIGS. 5 and 6 feeds motor 1, is connected to conduit 30, as a connection between the two motors 1 and 2, through two conduits 31 and 32 which in turn are connected through feeler 21.

Regulation is obtained either, as shown in FIG. 5, by partially short circuiting the first motor which is in advance by taking away part of its feed flow in order to supply it directly to the second motor, that is, the opposing motor as shown in FIG. 6, by closing its auxiliary conduits 31 and 32. The flow feeding the second motor then reaches it through the first motor which, due to its leakages, will receive a greater feed to overcome its delay.

When the beam shown in FIGS. 2 and 3 advances in the opposite direction to arrow F, and opposite to that above explained, motor 2 will be fed first, and will be in advance as shown in FIG. 2 and delayed as in FIG. 3.

As before, it is possible to correct these situations by providing a throttle between the conduit 33, first feeding the second motor, on one hand, and the conduit 30 connecting the two motors on the other hand, through conduits 32, 34 that which is connected by feeler 21 (FIGS. 7 and 8).

Feeler 21, according to the degree of the slope of the beam must regulate from zero to a predetermined value, depending on the maximum feed of the motors, the amount which will be directly fed to the second motor through conduit 32 and then conduit 30 between the two motors.

To this end, shaft 22 of the feeler is prolonged internally by a movable slide 35 extending into a sleeve 36. On the slide and in the sleeve grooves 37, 38 are provided for distribution of the lubricating film, as well as for creating deflectors that provide tightness between the different parts of the slide.

The throttle action of the feeler is obtained by a portion 39 of smaller diameter of the slide, joining the outside diameter of said slide by a chamfered edge 40 overlapping the side 41 of a groove 42. An orifice 43 opens into groove 42 and delivers the fluid to face 41. A orifice 44 in part 39 provides for discharge of the fluid.

The slide in sleeve 36 through chamfered edge 40 more or less throttles the flow of fluid and stops the flow entirely when the chamfer 40 seats on surface 39. The external diameter of the slide 35 is adjusted to the internal diameter of the sleeve above face 41.

In order to avoid sudden movements of the beam, orifice 44 forming the exit of the throttle opens into an axial bore 45 in the slide which communicates with orifice 44 forming the exit of the throttle opens into an axial bore 45 in the slide which communicates with orifice 46, connected to conduit 32 through a gauged orifice 47 that functions as a fixed regulator for the flow of fluid.

Orifice 47 can be a threaded plug 48 that partially obturates axial groove 45.

Beyond the internal end 49 of the shaft 22, at the base of the slide, sleeve 36 forms a chamber 50 which connects to and provides fluid under pressure to conduit 32 of the feeler and thus to the junction conduit 30 between the two motors. This pressure will furnish the necessary thrust (shown generally at 51 in FIG. 4) for support of roller 24 on flat 25. When this pressure becomes excessive, it is reduced through the action (shown generally at 52 in FIG. 4) of the fluid on the head of slide 35 having a surface area corresponding to the surface area of the base less the cross-sectional area of shaft 22. Thus, a recall of the slide is obtained when the fluid acts on the resulting differential surface. This action on the head of the slide allows the fluid to be taken off in axial duct 45 through orifice 53 that opens into a slot 54 opening into surface 55 of the head of the slide.

Such a device could guide each of the controlled motors alone. However, it has been observed (FIGS. 2 and 3) that whatever the advance of the beam may be, the direction of inclination of the beam corresponds to an equal lack of advance or delay of the first controlled motor and said delay can be overcome by directing more or less fluid into conduit 30 between the two motors.

It is therefore possible to use only one throttlefeeler when its entry orifice 43 is connected to the conduits 31 and 34, connecting conduits 29 and 33 between motors 1 and 2 and the source as well as the return of the fluid, through a pressure selector 56.

Pressure selector 56 selects the fluid with the highest pressure, and allows its free flow toward exit 57 (FIG. 4) and through orifice 43 at the entry of the throttle. Therefore, and due to leakages, the pressure is greater at the input than at the return, whatever the direction of input of the circuit may be. Input conduit 29 or 33 will always be put in communication with the junction conduit 30 between the two motors in order to partially short circuit the first motor that has been fed.

Selector 56 has two anti-return poppet valves 58, 59 having a ball 60 supported on a seat 61 controlling orificies 62, 63 connected to conduits 31, 34. These poppet valves are linked to the input orifice 43 of the throttle through ducts 64, 65, 66 and 67.

The throttle, the flow regulator 47 and the selector 56 are mounted on a solid block forming feeler 21.

In this embodiment, the throttle is formed when there is an acute angle (FIG. 3) of beam 5 and when shaft 22 is forced downwardly (FIG. 1), but slide 35 can be actuated with an inverted operation.

I claim:

1. Device for regulating the operation of two mechanically independent hydraulic motors mounted in series each motor movable along predetermined trojectories for driving one side of a movable machine, a longitudinal axis for said machine, said axis and said trajectories intersecting at a predetermined angle comprising a control circuit for fluid under pressure for the motors, derivation circuit means connected above and below the motor that is first fed with fluid under pressure as determined by the direction of the circulation of the fluid under pressure, said derivation circuit means including an adjustable throttle controlling the flow of fluid in said derivation circuit means, an element connecting said trojectories at said angle with said axis and feeler means engaging said element for actuating said throttle according to any change of said angle upon advance or delay of the first fed motor said derivation circuit means thus feeding the second motor with greater or lesser flow of fluid under pressure than that to the first fed motor whereby said second motor maintains the same relative position with respect to said first motor and said angle is returned to its predetermined value.

2. Device according to claim 1, including in said derivation circuit means after said adjustable throttle a fixed flow regulator and a small orifice for said regulator providing a maximum flow of fluid through said derivation circuit means to avoid sudden movement of the machine.

3. Device according to claim 1, said adjustable throttle including a movable slide in an external sleeve, a shaft for said slide actuated by said feeler, fluid entry and exit orifices for said throttle opening into separate grooves in said slide, a shoulder in said sleeve, and a co-operating shoulder on said slide, said shoulders throttling the flow of fluid between said orifices.

4. Device according to claim 3, said orifices of said adjustable throttle communicating through a duct with the ends of said slide for return of said slide by the differential action of the fluid under pressure on ends of said slide.

5. Device according to claim 3, including a roller on the end of said shaft, a surface on said element engaged by said roller reflecting changes in said angle, a guide for orientation or said roller including a plate rigidly locked to said shaft, a straightlined edge for said plate, and a bed-plate fixed with respect to said sleeve and engageable by said edge.

6. Device according to claim 3, said entry orifice of said throttle opening into a journal in said sleeve, said exit orifice opening into a journal in said slide, an axial duct in said slide connected to said exit orifice, a chamber in said sleeve at the base of said slide, said axial duct opening into said chamber, said flow regulator being a plug partially blocking said axial duct, and a conduit opening into said chamber and connected to the fluid control circuit between the two motors.

7. Device according to claim 6, including a radial duct opening into said axial duct and into a longitudinal groove in said slide, said groove opening into an end of said slide and canalizing the fluid to the surface of said end to exert a counter pressure on said slide to that exerted by the fluid in said chamber.

* * * * *